United States Patent [19]

Lambertus

[11] 3,837,781

[45] Sept. 24, 1974

[54] DEVICE FOR COOLING AND GRANULATING STRANDS OF PLASTIC MATERIAL DISCHARGED FROM AN EXTRUDER

[75] Inventor: Friedrich Lambertus, Stuttgart, Germany

[73] Assignee: Werner & Pfleiderer, Stuttgart-Feuerbach, Germany

[22] Filed: Nov. 24, 1972

[21] Appl. No.: 309,167

[30] Foreign Application Priority Data
Dec. 9, 1971   Germany............................ 2161067

[52] U.S. Cl................. 425/308, 425/337, 425/373, 425/377, 425/446, 425/455
[51] Int. Cl.............................................. B29f 3/08
[58] Field of Search ........... 425/373, 446, 308, 337, 425/455, 71, 73, 75, 377; 264/141, 210; 226/170, 172; 164/82, 276, 269

[56] References Cited
UNITED STATES PATENTS

| | | | |
|---|---|---|---|
| 2,576,317 | 11/1951 | Toulmin Jr. | 425/446 X |
| 2,672,650 | 3/1954 | Westerberg | 425/377 |
| 2,887,725 | 5/1959 | Vickers et al. | 264/210 R |
| 3,150,217 | 9/1964 | Shanok et al. | 425/377 |
| 3,602,944 | 9/1971 | Szabo et al. | 425/373 X |
| 3,609,805 | 3/1970 | Fritsch | 425/71 |
| 3,698,842 | 7/1970 | Eirich et al. | 425/75 |

*Primary Examiner*—R. Spencer Annear
*Assistant Examiner*—Mark Rosenbaum
*Attorney, Agent, or Firm*—Hane, Baxley & Spiecens

[57] ABSTRACT

There is disclosed a device for cooling and granulating strands of synthetic plastic material as they are continuously extruded through the discharge head of an extruder. The device comprises an extruder head with a plurality of side-by-side disposed discharge openings through which a corresponding number of strands are extruded. The strands are fed upon the pulling portion of a conveyor band disposed below the discharge head. The band has on its surface facing the discharge head a plurality of lengthwise grooves for receiving therein and holding spaced apart the strands fed upon it. The initially hot strands are cooled by directing a flow of coolant thereupon as they are carried along by the conveyor. A granulating device at the end of the pulling portion cuts the now cooled strands into pieces of selected length. The idling portion of the conveyor is subjected to cooling action so that is is reasonably cooled before it again becomes the pulling portion of the conveyor.

9 Claims, 7 Drawing Figures

3,837,781

DEVICE FOR COOLING AND GRANULATING STRANDS OF PLASTIC MATERIAL DISCHARGED FROM AN EXTRUDER

The invention relates to a device for cooling and granulating strands of plastic material discharged from an extruder, and more particularly to a device in which the strands are discharged through side-by-side disposed discharge nozzles of an extruder containing a melt of synthetic plastic material upon a conveyor band associated with a granulating means.

BACKGROUND

There is known in the technique for processing synthetic plastic material the production of a granulate of the material as an intermediate product. Such granulate can be conveniently conveyed and accurately metered without difficulty for utilization in machines in which further processing is to be effected, such as extrusion molding machines. The granulate is produced by cutting or chopping up strands of the symthetic plastic material as it is pressed out from an extruder.

There are now known two basic methods of effecting granulation, one of these methods being carried out at elevated temperatures of the material, and the other at cooled temperatures of the material.

The production of granulate from cooled material provides that the strands are passed through a cooling path or a cooling bath before they are fed to a cutting device, that is, the granulator proper. The cooling processing method is no longer very much employed. Modern development calls for rapidly increasing quantities of material to be processed and, hence, the speed with which the strands are discharged from the extruder becomes higher and higher. The strands are guided through the cooling bath via guide rollers and must be manually placed about the rollers when the machine is started, and they must also be guided into the granulator proper. Such manual guiding of the strands of material upon the rollers of the granulator must be repeated each time a strand breaks. This requires considerable dexterity on the part of the service personnel and is the reason that the discharge speed of the strands and thus of the output of the machine can be increased only to a moderate extent.

The afore-indicated limitations of the cooled processing method has resulted in the last years in increasing popularity of the warm processing method in which the strands of synthetic plastic material are chopped up by rotary knives immediately after emerging from a perforated discharge disc of the extruder. The thus produced granulate is then subjected to the action of a coolant. As an example of this method may be mentioned the so-called water ring granulation.

The granulate obtained by the warm granulation have a more or less rounded off shape while cooled granulation generally results in granules with sharp edges. It has been found that sharp edged granules obtained by the cooled processing method can be fed much easier into the machines used for further processing than granulate obtained by the warm granulation method. This behavior difference of granules obtained by the afore-two mentioned methods of processing is very considerable at least for some types of synthetic plastics. This fact makes cool control of the granulation again very desirable provided a way can be found of automating the discharge of the strands from the extruder, the subsequent cooling of the strands and the granulating of the cooled strands.

There is known, for instance from German printed publication DAS Pat. No. 1,542,405, to accelerate the strands of synthetic plastic material by the suction action of a flow of liquid or gas. A second liquid or gas flow parallel to the first one effects the required cooling. The disadvantage of this method is the high installation costs and also, the high operation costs. Moreover, it is also costly to maintain the required large flows of liquid or gas and the power requirements of this type of operation are very considerable.

There is further known, for instance from German printed publication DAS Pat. No. 1,916,222, a device for cooling extruded strands of synthetic plastic material in which a driven conveyor band in conjunction with a second conveyor band serving as a pressure means constitute an inlet funnel disposed underneath the extruder. The first conveyor band is guided via deflection rollers through a cooling bath and the inlet funnel formed by both bands can be moved out of a position in which it is located above the level of the cooling bath into a position in which it is below this level. A device of this kind also requires high installation costs; moreover, it is disadvantageous that the strands of synthetic plastic material are enclosed by the two conveyor bands. As a result, the heat exchange between the strands and the cooling bath is impeded and this requires a considerable elongation of the cooling path.

There is also known a device in which the strands of synthetic material are fed directly after emerging from the extruder through a water bath and then via a flat conveyor band to a granulating device of the kind shown in U.S. Pat. No. 2,887,725. With such a device an automation of the cooling and granulating steps is also not possible.

THE INVENTION

It is an object of the invention to provide a novel and improved device for cooling and granulating strands of synthetic plastic material discharged from an extruder with which an efficient cooling and granulating of the extruded strands can be effected and which is capable of being automated.

A more specific object of the invention is to provide a novel and improved cooling and granulating device with which an automated cool granulation operation is possible even if the output of the material is a very high one.

SUMMARY OF THE INVENTION

The aforepointed out objects, features and advantages, and other objects, features and advantages which will be pointed out hereinafter are obtained by providing underneath a row of discharge heads of the extruder a power driven conveyor band including lengthwise grooves for receiving therein individual strands of the extruded synthetic material, and by further providing that the pulling portion of the conveyor band which constitutes the cooling and conveying path between the extruder and the granulating device has openings for directing a coolant upon the strands; the idling portion of the conveyor band being guided through a cooling bath.

In the event the conveying speed of the band is high it is advantageous and in accordance with the invention to provide a profiled roller which is pivotal into a position in which it forces the strands located in the pulling portion of the band to remain in the grooves in the band.

When it is desired to stretch the strands after emerging from the extruder for the purpose of obtaining a granulate of reduced diameter, the invention also provides a device in which the drive of the conveyor band is at a higher speed than the discharge speed of the strands from the discharge head of the extruder. Stretching of the strands is effected by providing a selected length of the strands of synthetic plastic material before they are actually conveyed by the conveyor band due to the friction of the strands with the walls of the grooves in the band.

In the event the stretching to be obtained is considerable, the length of non-transport must be selected longer than normal. To assure even under such circumstances automatic guiding of the strands into the lengthwise grooves on the conveyor band, a profiled guide plate constituting a slanted plane is provided between the extruded discharge head and the conveyor band.

In the event of low viscosity of the synthetic plastic material, it may occur that the strands emerging from the extruder head frequently break before they come correctly to rest on the conveyor band. The invention provides for such conditions that an independently drivable profiled guide roller is mounted between the extruder head and the conveyor band.

The costs of a device according to the invention can be reduced by providing as conveyor band a multi- or poly V-belt of conventional design. This belt is used in a position opposite to that in which such belt is normally used and is placed in such reversed position on the driving pulley and the guide pulley of the conveyor.

A convenient transport of the device to any desired location can be obtained by mounting the conveyor band including all the components associated therewith as previously described, except the extruder and the granulating device proper, on a wheeled frame structure or cart.

The device of the invention has in addition to making possible a reliable automation of the cooled granulating process, the advantage that it is readily applicable to low viscosity synthetic plastics. It is generally difficult to obtain a fully satisfactory granulate from such low viscosity synthetic plastic.

In comparison with the cooled granulating devices as heretofore known, the device of the invention requires much lower installation costs. It also makes it possible to obtain for a given diameter of the nozzles in the spray or discharge head of the extruder a finely grained granulate by stretching the discharged strands. This has the great advantage that there is no need for a small diameter of the extruder nozzles and thus high pressure build up in the extruder as automatically caused by small diameter extruder nozzles is avoided.

BRIEF DESCRIPTION OF THE INVENTION

In the accompanying drawing several embodiments of the invention are shown by way of illustration and not by way of limitation.

DETAILED DESCRIPTION OF THE INVENTION

Figure 1:
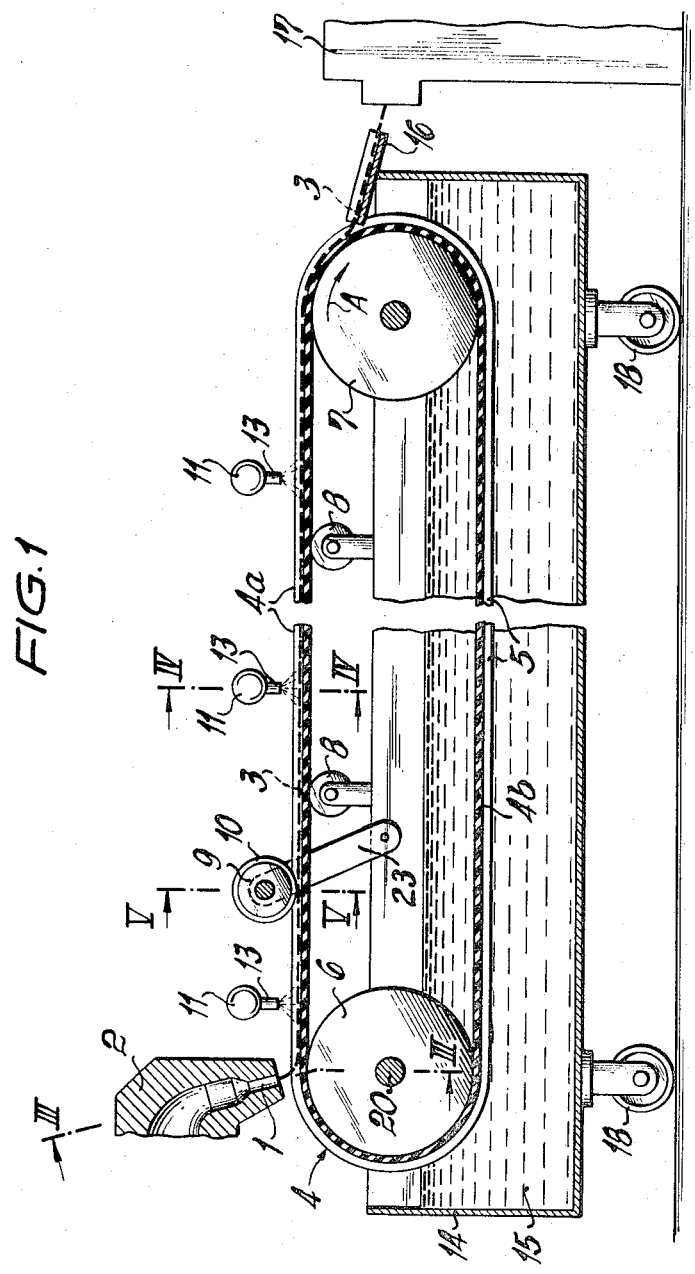
FIG. 1 is a lengthwise sectional view of a cooling and granulating device according to the invention.

Referring now to the figures more in detail, the device as exemplified in FIG. 1 comprises a row of side-by-side disposed nozzles 1 of a spray or discharge head 2 of an extruder (not shown) from which a corresponding number of strands 3 of synthetic plastic material are discharged. These strands, which are indicated in dashed lines, are delivered to a driven conveyor band 4 for transport on the same.

As it is shown in FIGS. 2 to 5 the conveyor band is formed on its outer surface with side-by-side arranged lengthwise grooves 5 preferably having a V-shaped cross-section, one for each nozzle. The conveyor band as shown is a conventional multiple V belt such as a poly V belt as manufactured and marketed by the German company, Hilgart Kern of Mannheim, Germany. The conveyor band is disposed in reversed position, that is, with its flat side facing inwardly and its profiled side outwardly. It is guided over a driving drum or pulley 6 and a guide drum or pulley 7. Arrow A indicates the rotational direction of the drums and thus of the conveyor band. To avoid sagging of the band, one or more idlers 8 preferably support the band intermediate the pulleys; the pulling portion of the band being designated by 4a and the idling portion by 4b.

Due to the described profiling of the conveyor band mutual contact and thus sticking of the strands is avoided. Each of the strands lies in one lengthwise groove of the band and is carried along by the frictional adhesion between the strands and the V profiles. At higher speeds of the conveyor band, and particularly if the speed/min of the band is higher than the speed at which the strands emerge from discharge head 2, thereby causing a stretching of the strands, the frictional adhesion which is a function of the weight of the strands, may not be sufficient. To prevent a detachment of strands from the grooves under such conditions, a roller 9 with a counter profile 10 (see FIG. 5) are provided on conveyor band 4 thereby pressing the strands into grooves 5, thus increasing the friction between the strands of the conveyor band.

In most instances, that is under normal conditions, the pressure exerted by the weight of roller 9 is sufficient. In special cases, the pressure upon the strands can be increased by a spring, the pressure of which is preferably adjustable. The strands 3 when emerging from the nozzles 1 are rather hot and have a more or less low viscosity. To obtain the required tensile strength of the strands and to avoid damage to the conveyor band 4 the strands must be immediately cooled. Such cooling is effected by means of distrbutor pipes or ducts 11 through which is guided a coolant, usually water, by a feed conduit 12 indicated in FIGS. 2 and 4. The coolant reaches the strands 3 directly via narrow tubes or nozzles 13. Means are preferably provided to adjust the force of the stream of coolant applied to the strands.

The idling portion 4b of the conveyor band is guided through a cooling bath 15 in a container 14. The coolant as it is automatically carried along by the strands when the same emerge from the cooling bath prevents an adhesion of the strands of plastic material on the conveyor band. At the end of the pulling portion 4a of the conveyor the strands are separated therefrom by a stripper or doctor blade 16. This stripper also includes lengthwise grooves and guides the strands to a conventional granulating device 17 in which the strands are chopped or cut to strands of the desired length.

As previously mentioned, the diameter of the granulated material is controlled during the stretching of the strands of plastic material, that is, the stretching action is a function of the differential between the speed of the conveyor band and the discharge speed at the discharge head of the extruder.

The device of the invention is supported by wheels 18 with the exception of the extruder and the granulator device itself so that it can be easily moved to a desired point of utilization.

Figure 2:
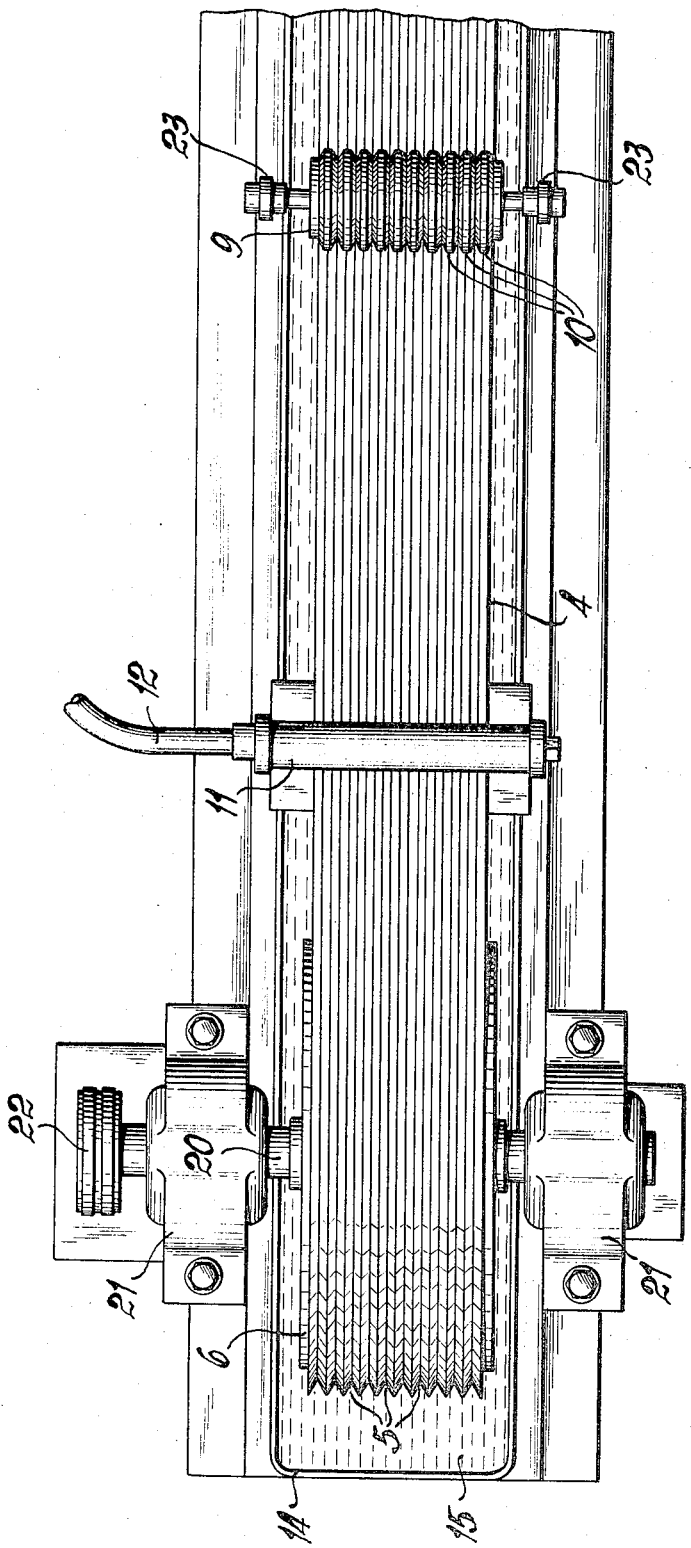
FIG. 2 is a plan view upon the lefthand part of the device according to FIG. 1 on an enlarged scale and the discharge head of the extruder being omitted.

The driving pulley 6 is mounted on a shaft 20 which is journaled in two bearings 21 as shown in FIG. 2. A V-belt type driving pulley 22 serves to transmit to pulley 6 the driving force of a variable speed motor which is not shown and should be visualized as being conventional.

Figure 3:
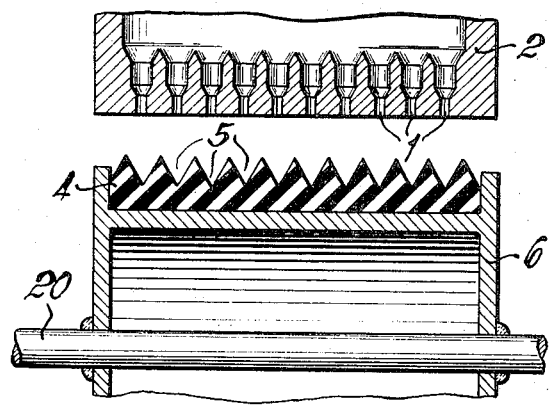
FIG. 3 is a fractional sectional view of the device according to FIG. 1 taken on line III—III.

FIG. 3 shows a section through extruder spray or discharge head 2 and driving pulley 6. The strands are not shown to simplify the illustration. As it is apparent, one of lengthwise grooves 5 on the conveyor band passes under each nozzle 1.

Figure 4:
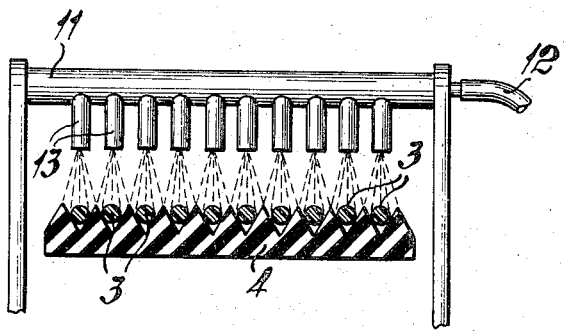
FIG. 4 is a sectional view taken on line IV—IV of FIG. 1.

FIG. 4 shows a section of the conveyor band at the location of one of the coolant distributing pipes 11. The figure also shows the strands 3 guided in the grooves 5 in the conveyor band and how the coolant is directed by the tubes 13 upon the strands.

Figure 5:
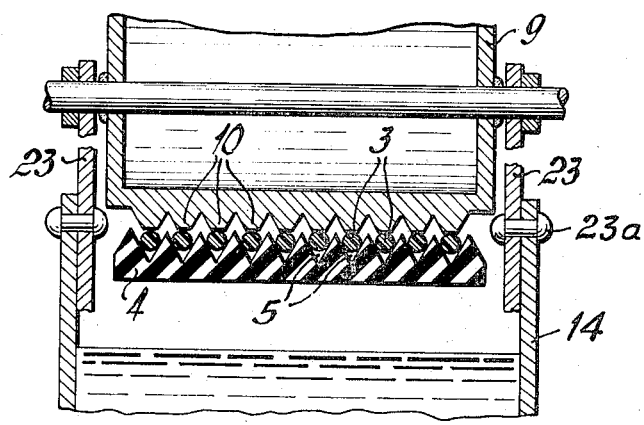
FIG. 5 is a sectional view taken on line V—V of FIG. 1.

FIG. 5 is a cross-section of pressure roller 9 and shows the circumferential counter grooves 10 on the roller for pressing the strands into the lengthwise grooves 5 on the conveyor band. Two flat bars 23 pivotal about pins 23a provide a lateral guidance for roller 9.

Figure 6:
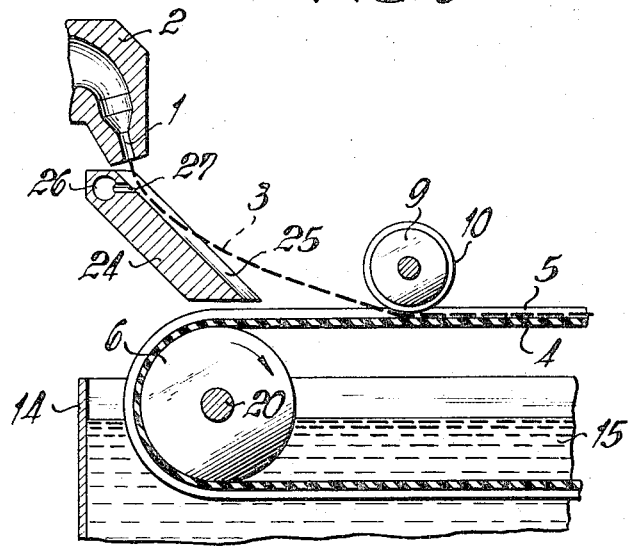
FIG. 6 is a fractional sectional view of a modification of the device including a profiled guide plate disposed between the discharge head of the extruder and the conveyer band.

FIG. 6 shows an embodiment designed for a high speed conveyor band. If at such high speed of the band the strands of plastic material are to be stretched, stretching must occur between extruder head 2 and pressure roller 9. This free length of travel of the bands is bridged when the device is started by a guide plate 24 forming a slanted plane. Plate 24 includes lengthwise grooves 25 similar to the grooves 5 in the conveyor band and guides the strands spaced apart toward the conveyor band.

To effect cooling of the hot strands and also to avoid sticking thereof, plate 24 includes a duct 26 for a cooling with feed duct 27 for each groove 25 in the plate. One of the strands 3 is shown by dashed lines in its operational position, that is, after it has been passed between band 4 and roller 9 and is being stretched.

Figure 7:
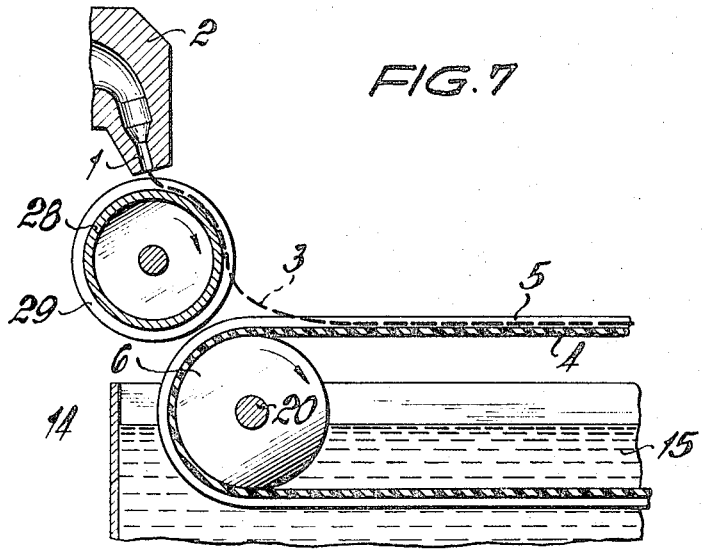
FIG. 7 is a fractional sectional view of a further modification of the device showing a profiled guide roller between the discharge head of the extruder and the conveyor band.

In FIG. 7 an embodiment is shown which is used when a very low viscosity plastic material is to be granulated. Strands formed of such material tend to tear easily and are for that reason supported by a rotary guide roller 28. This roller has on its outer surface circumferential grooves 29 which correspond to gooves 5 on band 4. Roller 28 is independently driven and has normally a lower circumferential velocity than the speed of the conveyor band. FIG. 7 also shows one of the strands 3 in its operational position. A coolant distributor pipe similar to pipe 11 shown in FIG. 1 should be visualized as being provided above roller 28.

When a particularly effective cooling of the extruded strands of plastic material is required, the pulling portion 4a of the conveyor band may be guided for part of its length through cooling bath 15 by means of suitable guide rollers. Such guidings of the conveyor band does not vary the basic concept of the invention.

For purpose of cooling and granulating of hard plastics (Duroplastea), the device according to the invention is changed from the described embodiment in that air rather than water is used for cooling of the strands. The distributor pipes 11 and the nozzles are then suitably modified for directing a pressurized air flow upon the strands 3. The idling portion of the conveyor band is also suitably cooled with air.

Basically, the selection of the coolant depends on the plastic material to be processed. If the plastic material is not compatible to water, organic coolants may also be used; suitable organic coolants are well known and readily available in the market.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A device for cooling and granulating strands of synthetic plastic material extruded through the discharge head of an extruder, said device comprising in combination:

an extruder discharge head having a plurality of side-by-side disposed discharge openings for extruding strands of the material;

a single continuous endless conveyor band defining a pulling portion and an idling portion and disposed underneath said discharge openings for feeding extruded strands upon one end of said pulling portion, said conveyor band including in its surface facing the discharge openings a plurality of lengthwise parallel grooves for supporting and holding apart strands fed upon said pulling portion;

granulating means disposed adjacent to the other end of said pulling portion for cutting the strands to pieces of selected length;

first cooling means disposed above the pulling portion of the conveyor band intermediate the ends thereof, said cooling means including discharge means for directing a coolant upon the surface of said pulling portion facing the discharge openings and the strands exposed in the grooves thereof as they pass said discharge openings of the cooling means; and second cooling means disposed for cooling said idling portion of the conveyor band as said portion passes the second cooling means.

2. The device according to claim 1 wherein said second cooling means comprises a container for a supply of a cooling liquid, the idling portion of the conveyor band being guided through said container.

3. The device according to claim 1 and comprising a profiled roller pivotally mounted above the pulling portion of the conveyor band, the weight of said roller moving the same toward said pulling portion for holding strands within the grooves provided in the conveyor band.

4. The device according to claim 1 and comprising drive means coupled to the conveyor band for driving the same at a speed higher than the discharge speed of strands through said discharge openings of the extruder head.

5. The device according to claim 1 wherein a profiled guide member is disposed between the discharge openings in the extruder head and the pulling portion of the conveyor band for guiding strands emerging from said discharge openings toward said pulling portion and into the grooves therein.

6. The device according to claim 5 wherein said guide member is in the form of a slanted plate.

7. The device according to claim 5 wherein said guide member is in the form of a roller rotatable independently of the conveyor band, said roller having circumferential grooves in its peripheral surface.

8. The device according to claim 1 wherein said conveyor band comprises a multiple V-belt, said belt being disposed with its V-shaped grooves facing said discharge openings, and wherein said conveyor band is guided on and supported by a driving pulley and a guide pulley facing said pulleys with its smooth side.

9. The device according to claim 1 in which said conveyor band and said first and second cooling means are mounted on a wheeled frame structure, and wherein the extruder head and the granulating means are separately mounted.

* * * * *